(12) United States Patent
Matsunami et al.

(10) Patent No.: US 10,309,598 B2
(45) Date of Patent: Jun. 4, 2019

(54) LUMINAIRE

(71) Applicant: PANASONIC INTELLECTUAL PROPERTY MANAGEMENT CO., LTD., Osaka (JP)

(72) Inventors: Hirotaka Matsunami, Osaka (JP); Shintaro Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 15/396,901

(22) Filed: Jan. 3, 2017

(65) Prior Publication Data

US 2017/0198874 A1 Jul. 13, 2017

(30) Foreign Application Priority Data

Jan. 8, 2016 (JP) .................................. 2016-002977

(51) Int. Cl.
*F21K 9/64* (2016.01)
*F21K 9/90* (2016.01)
*F21V 9/30* (2018.01)
*G02B 3/00* (2006.01)
(Continued)

(52) U.S. Cl.
CPC .............. *F21S 10/026* (2013.01); *F21K 9/64* (2016.08); *F21K 9/90* (2013.01); *F21V 9/30* (2018.02);
(Continued)

(58) Field of Classification Search
CPC .. F21S 10/026; F21K 9/64; F21K 9/30; F21K 9/90; G02B 1/116; G02B 3/0006;
(Continued)

(56) References Cited

U.S. PATENT DOCUMENTS 9,052,582 B2 * 6/2015 Komatsu .............. G03B 21/204
9,458,988 B2 * 10/2016 Caruso ..................... F21V 9/10
(Continued)

FOREIGN PATENT DOCUMENTS

JP 2011-060884 3/2011
JP 2011-108535 6/2011
(Continued)

*Primary Examiner* — Mary Ellen Bowman
(74) *Attorney, Agent, or Firm* — Greenblum & Bernstein, P.L.C.

(57) ABSTRACT

A luminaire includes an excitation light source which emits excitation light. A first fluorescent plate includes a first principle surface disposed across the optical axis of the excitation light. A first phosphor layer is arranged discretely along the first principle surface. A second fluorescent plate is arranged at the downstream side of the excitation light with respect to the first fluorescent plate. The second fluorescent plate includes a second principle surface disposed across the optical axis. A second phosphor layer is arranged discretely along the second principle surface. The second phosphor layer has a wavelength conversion characteristic different from a wavelength conversion characteristic of the first phosphor layer. A support supports the first fluorescent plate and the second fluorescent plate such that at least one of relative positions and rotations of the first fluorescent plate and the second fluorescent plate are adjustable.

18 Claims, 7 Drawing Sheets

(51) Int. Cl.
  *G02B 5/02* (2006.01)
  *F21S 10/02* (2006.01)
  *G02B 1/116* (2015.01)
  *F21Y 115/10* (2016.01)
  *F21Y 115/20* (2016.01)
  *F21Y 115/30* (2016.01)

(52) U.S. Cl.
  CPC ............ *G02B 1/116* (2013.01); *G02B 3/0006* (2013.01); *G02B 5/02* (2013.01); *F21Y 2115/10* (2016.08); *F21Y 2115/20* (2016.08); *F21Y 2115/30* (2016.08)

(58) Field of Classification Search
  CPC .... G02B 5/02; F21Y 2115/20; F21Y 2115/30; F21Y 2115/10
  See application file for complete search history.

(56) References Cited

U.S. PATENT DOCUMENTS

| | | | |
|---|---|---|---|
| 9,500,345 B2* | 11/2016 | Yang | G03B 21/204 |
| 9,753,275 B2* | 9/2017 | Motoya | G02B 26/008 |
| 2011/0116253 A1* | 5/2011 | Sugiyama | F21S 10/007 |
| | | | 362/84 |
| 2011/0284879 A1* | 11/2011 | Lin | F21V 3/00 |
| | | | 257/88 |
| 2016/0104749 A1 | 4/2016 | Tsuji et al. | |

FOREIGN PATENT DOCUMENTS

| | | |
|---|---|---|
| JP | 2011-142000 | 7/2011 |
| JP | 2012-221634 | 11/2012 |
| JP | 2006-332384 | 12/2016 |

* cited by examiner

LUMINAIRE

CROSS REFERENCE TO RELATED APPLICATION

This application claims the benefit of priority of Japanese Patent Application Number 2016-002977 filed on Jan. 8, 2016, the entire content of which is hereby incorporated by reference.

BACKGROUND

1. Technical Field

The present disclosure relates to a luminaire using phosphors.

2. Description of the Related Art

Conventionally, luminaires using phosphors having a plurality of different wavelength conversion characteristics have been known (for example, see Patent Literature 1: Japanese Unexamined Patent Application Publication No. 2011-142000).

The luminaire disclosed in Patent Literature 1 includes a reflector mechanism which moves an irradiation position of excitation light emitted from the excitation light source in order to selectively irradiate two kinds of phosphor layers with the excitation light. In this way, the luminaire disclosed in Patent Literature 1 can selectively emit light beams having two kinds of different color temperatures.

SUMMARY

However, the luminaire disclosed in Patent Literature 1 has the reflector mechanism and also requires space for securing an optical path for excitation light, which involves a problem that the luminaire needs to be large.

An aspect of the present disclosure was made to solve such a problem, and has an object to provide a luminaire which is capable of varying emission light colors and has smaller dimensions.

In order to achieve the above object, an aspect of luminaire according to the present disclosure includes: an excitation light source which emits excitation light; a first fluorescent plate disposed across the optical axis of the excitation light, and including a first phosphor layer arranged discretely when the first fluorescent plate is seen in the direction of the optical axis; a second fluorescent plate (i) arranged at the downstream side of the excitation light with respect to the first fluorescent plate disposed across the optical axis, and (ii) including a second phosphor layer having a wavelength conversion characteristic different from a wavelength conversion characteristic of the first phosphor layer and arranged discretely when the second fluorescent plate is seen in the direction of the optical axis; and a support which supports the first fluorescent plate and the second fluorescent plate in such a manner that at least one of relative positions and postures of the first fluorescent plate and the second fluorescent plate are adjustable.

According to the present disclosure, it is possible to provide the luminaire which is capable of varying emission light colors and has smaller dimensions.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an embodiment of the present disclosure is described with reference to the drawings. Exemplary embodiment described below shows a specific example of the present disclosure. Thus, the numerical values, shapes, materials, constituent elements, the arrangement and connection of the constituent elements, etc. described in the following embodiment are mere examples, and therefore do not limit the scope of the present disclosure. Accordingly, among the constituent elements in the following exemplary embodiments, constituent elements not recited in any one of the independent claims which define the most generic concept of the present disclosure are described as arbitrary constituent elements.

It is to be noted that each of the diagrams is a schematic diagram, and is not always illustrated precisely. In the diagram, the same numerical references are assigned to substantially the same elements, and the same descriptions are simplified or not repeated below.

Embodiment

[1. Configuration]

First, a rough configuration of a luminaire according to an embodiment is described with reference to the drawings.

Figure 1:
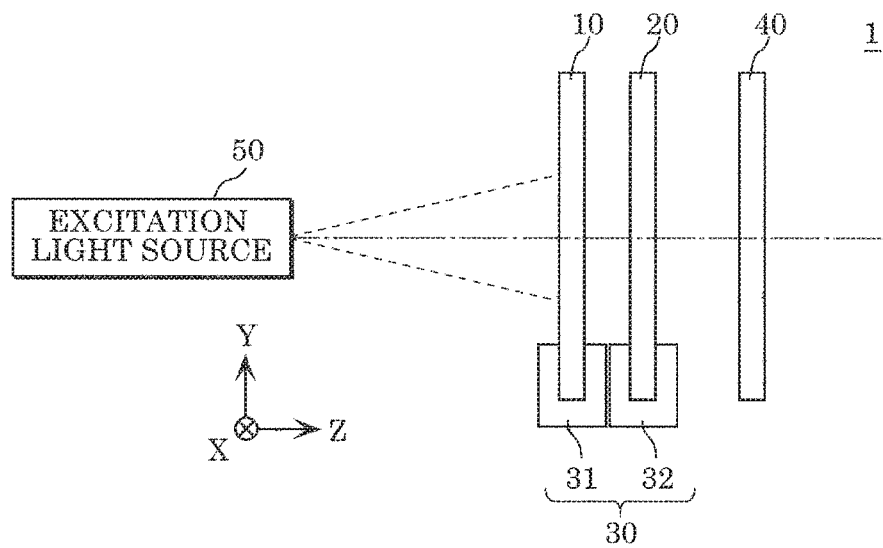
FIG. 1 is a schematic view of a rough configuration of a luminaire according to an embodiment.

FIG. 1 is a schematic view of a rough configuration of luminaire 1 according to the embodiment.

Luminaire 1 illustrated in FIG. 1 is a luminaire capable of varying emission light colors of emitted light.

As illustrated in FIG. 1, luminaire 1 includes excitation light source 50, first fluorescent plate 10, second fluorescent plate 20, and support 30. In addition, in this embodiment, luminaire 1 further includes diffuser 40. It is to be noted that, in FIG. 1 and the drawings below, it is assumed that the direction of optical axis J of excitation light source 50 is the Z-axis direction, and that two directions orthogonal to optical axis J are the X-axis direction and the Y-axis direction. Hereinafter, each of constituent elements of luminaire 1 according to the embodiment is described.

[Excitation Light Source]

Excitation light source 50 is a light source which emits excitation light. In this embodiment, excitation light source 50 is a semiconductor laser element which emits blue light having a wavelength approximately ranging from 440 nm to 460 nm along optical axis J. As excitation light source 50, it is possible to use, for example, a nitride semiconductor laser element fabricated using a nitride semiconductor.

[First Fluorescent Plate]

First fluorescent plate 10 is a fluorescent plate disposed across optical axis J of excitation light. Hereinafter, first fluorescent plate 10 is described with reference to the drawings.

Figure 2:
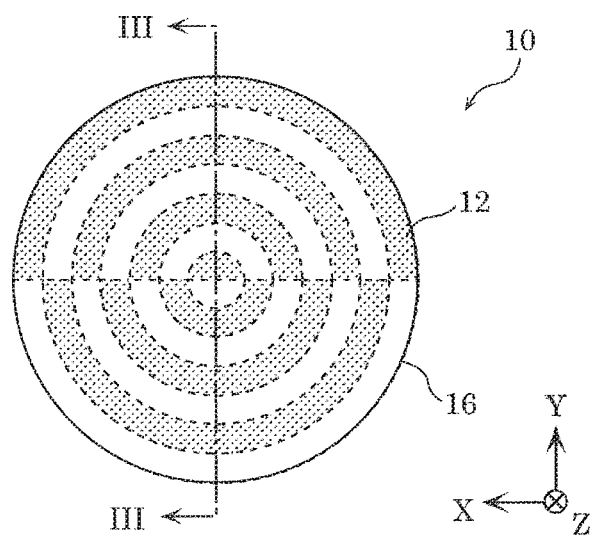
FIG. 2 is a plan view of a rough configuration of a first fluorescent plate of the luminaire according to the embodiment.

FIG. 2 is a plan view of a rough configuration of first fluorescent plate 10 of luminaire 1 according to the embodiment. FIG. 2 is a plan view in the case where first fluorescent plate 10 is seen from the excitation light source 50 side (the negative side of the Z-axis direction) in the direction of optical axis J.

Figure 3:
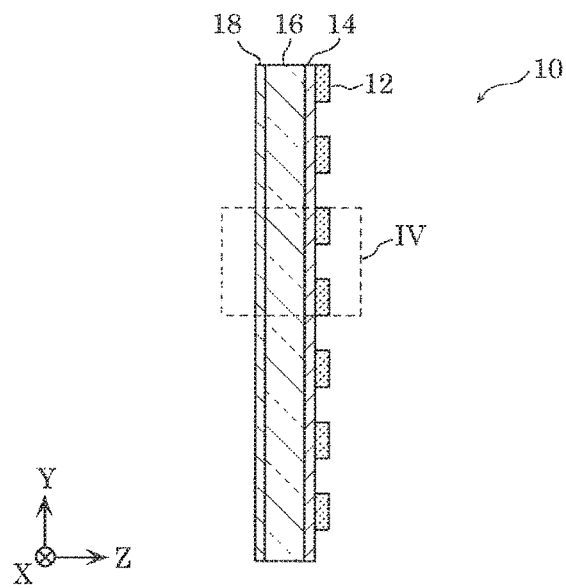
FIG. 3 is a cross-sectional view of the first fluorescent plate according to the embodiment.

FIG. 3 is a cross-sectional view of first fluorescent plate 10 according to the embodiment. FIG. 3 illustrates the III-III cross section illustrated in FIG. 2

Figure 4:
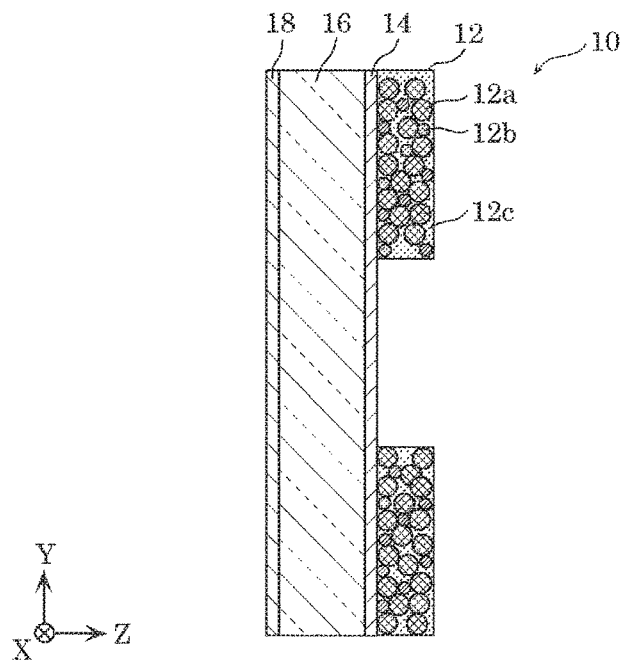
FIG. 4 is a partly-enlarged cross-sectional view of the first fluorescent plate according to the embodiment.

FIG. 4 is a partly-enlarged cross-sectional view of first fluorescent plate 10 according to the embodiment. FIG. 4 illustrates an enlarged view of a region within broken-line frame IV illustrated in FIG. 3.

First fluorescent plate 10 is a plate-shaped member disposed across optical axis J of excitation light. First fluorescent plate 10 receives the excitation light and emits fluorescence. As illustrated in FIG. 3, first fluorescent plate 10 includes first phosphor layer 12, substrate 16, antireflective film 18, and dichroic mirror 14.

First phosphor layer 12 is a layer which receives the excitation light and emits fluorescence. First phosphor layer 12 has, for example, a thickness of approximately 10 μm to 50 μm, as a non-limiting thickness. First phosphor layer 12 can be formed by, for example, printing on substrate 16, as a non-limiting formation method. In this embodiment, first fluorescent plate 10 includes, as a phosphor layer, only first phosphor layer 12 having a uniform composition. In this way, it is possible to easily form phosphor layer 12 on first fluorescent plate 10 in a one-time process.

As illustrated in FIG. 2, phosphor layer 12 is arranged discretely on a principal surface of substrate 16 when seen in the direction of optical axis J of excitation light. Here, when phosphor layer 12 is arranged in a non-uniform manner, the arrangement is referred to as "discrete arrangement". For example, the phrase "discrete arrangement" is not limited to an arrangement in which phosphor layer 12 is divided into plural segments and the segments are arranged individually. For example, an arrangement in which phosphor layer 12 is arranged to form a curved line is also referred to as "discrete arrangement". In this embodiment, as illustrated in FIG. 3 and FIG. 4, first phosphor layer 12 is arranged on the principal surface of substrate 16 located at the downstream side (the positive side of the Z-axis direction) of excitation light. First phosphor layer 12 is arranged on the principal surface of substrate 16 in a line symmetric manner with respect to the line of the Y-axis direction. First phosphor layer 12 is arranged in an approximately concentric semicircular shaped pattern. A pattern corresponding to the region in which first phosphor layer 12 is not arranged in a half region at the positive side of the Y-axis direction of the principal surface of substrate 16 approximately matches a pattern in which first phosphor layer 12 is arranged in the other half region at the negative side of the Y-axis direction.

First phosphor layer 12 includes a first wavelength conversion characteristic. First phosphor layer 12 includes yttrium aluminum garnet (YAG) phosphors as a non-limiting example in this embodiment. The use of YAG as phosphors makes it possible to convert blue excitation light into yellow fluorescence in first phosphor layer 12. The phosphors included in first phosphor layer 12 have a grain diameter approximately ranging from 1 μm to 30 μm for example. In this embodiment, as illustrated in FIG. 4, first phosphor layer 12 includes phosphors 12a having a large grain diameter, phosphors 12b having a small grain diameter, and sealing member 12c.

Since phosphors are more efficient in converting excitation light into fluorescence, it is possible to increase conversion efficiency using phosphors 12a. It is to be noted that the grain diameter of phosphors 12a is, for example, smaller than or equal to one-third of the thickness of first phosphor layer 12. When the grain diameter of phosphors 12a exceeds one-third of the thickness of first phosphor layer 12, it is difficult to form first phosphor layer 12 by printing.

On the other hand, phosphors 12b having a small grain diameter is effective in diffusing excitation light. For this reason, it is possible to mix excitation light and fluorescence more efficiently using phosphors 12b. It is to be noted that second phosphor layer 22 may include plural kinds of phosphors as the phosphors. Examples of such plural kinds of phosphors for use include YAG, SCASN ((Sr, Ca)AlSiN$_3$: Eu$^{2+}$ phosphors). In this case, the plural kinds of phosphors may be mixed in first phosphor layer 12, or first phosphor layer 12 may be formed with phosphor layers including different kinds of phosphors.

Substrate 16 is a translucent member which is a base of first fluorescent plate 10. In this embodiment, substrate 16 has a disc shape. It is to be noted that substrate 16 may have, for example, a rectangular plate shape, instead of the non-limiting disc shape. Substrate 16 can be made of sapphire or the like. The use of a member having a high thermal conductivity such as sapphire makes it possible to efficiently release heat generated in first phosphor layer 12 etc. of first fluorescent plate 10.

Antireflective film 18 is a film which reduces reflection of excitation light that enters first fluorescent plate 10, and, as illustrated in FIGS. 3 and 4, is arranged on the principal surface (the incident surface of the excitation light) at the excitation light source 50 side (the negative side of the Z-axis direction) of substrate 16. In this embodiment, antireflective film 18 reduces reflection of blue light having a wavelength approximately ranging from 440 nm to 460 nm. In this way, it is possible to efficiently use excitation light. In addition, antireflective film 18 may be optimized to reduce reflection of light having a wavelength of approximately 445 nm. Antireflective film 18 may be, for example, a dielectric multi-layer film. The dielectric multi-layer film is made of, for example, inorganic materials (such as $SiO_2$, $TiO_2$, $Al_2O_3$, MgF) which are highly resistant to light and heat.

Dichroic mirror 14 is a mirror which allows excitation light to pass through, and reflects fluorescence emitted from first phosphor layer 12. Dichroic mirror 14 is arranged at the excitation light source 50 side (the negative side of the Z-axis direction), that is, the upstream side of excitation light, with respect to first phosphor layer 12. Dichroic mirror 14 reduces propagation of fluorescence emitted from first phosphor layer 12 to the excitation light source 50 side. In this way, it is possible to increase use efficiency of fluorescence emitted from first phosphor layer 12. In other words, it is possible to increase the amount of fluorescence to be emitted from luminaire 1.

[Second Fluorescent Plate]

Second fluorescent plate 20 is a fluorescent plate arranged at the downstream side of excitation light with respect to first fluorescent plate 10 disposed across optical axis J of excitation light. Hereinafter, second fluorescent plate 20 is described with reference to the drawings.

Figure 5:
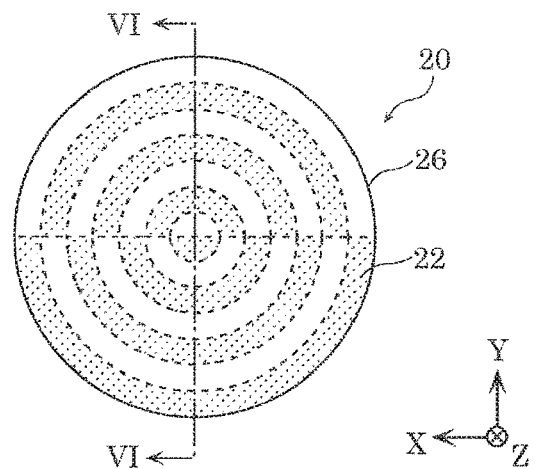
FIG. 5 is a plan view of a rough configuration of a second fluorescent plate of the luminaire according to the embodiment.

FIG. 5 is a plan view of a rough configuration of second fluorescent plate 20 of luminaire 1 according to the embodiment. FIG. 5 is a plan view in the case where second fluorescent plate 20 is seen from the excitation light source 50 side in the direction of optical axis J.

Figure 6:
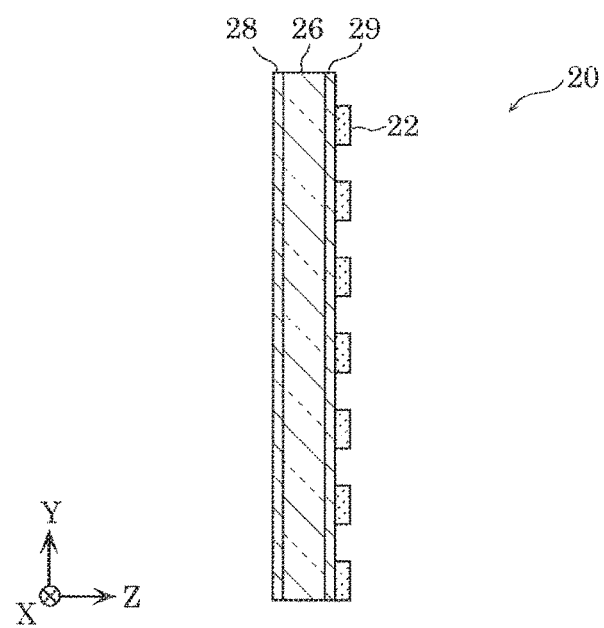
FIG. 6 is a cross-sectional view of the second fluorescent plate according to the embodiment.

FIG. 6 is a cross-sectional view of second fluorescent plate 20 according to the embodiment. FIG. 6 illustrates the IV-VI cross section illustrated in FIG. 5.

Second fluorescent plate 20 is a plate-shaped member arranged at the downstream side of excitation light with respect to first fluorescent plate 10 disposed across optical axis J of excitation light. Second fluorescent plate 20 receives the excitation light and emits fluorescence. As illustrated in FIG. 6, second fluorescent plate 20 includes second phosphor layer 22, substrate 26, and antireflective films 28 and 29.

Second phosphor layer 22 is a layer which receives the excitation light and emits fluorescence. As illustrated in FIG. 5, second phosphor layer 22 is arranged discretely on a principal surface of substrate 26 when seen in the direction of optical axis J of excitation light. Here, when first phosphor layer 12 is arranged in a non-uniform manner, the arrangement is referred to as "a discrete arrangement" for convenience sake. In this embodiment, as illustrated in FIG. 6, second phosphor layer 22 is arranged on the principal surface located at the downstream side (the positive side of the Z-axis direction) of excitation light of substrate 26. Second phosphor layer 22 is arranged on the principal surface of substrate 26 in a line symmetric manner with respect to the line of the Y-axis direction. Second phosphor layer 22 is arranged in an approximately concentric semicircular shaped pattern. A pattern corresponding to the region in which second phosphor layer 22 is not arranged in one of half areas at the positive side of the Y-axis direction of the principal surface of substrate 26 approximately matches a pattern in which second phosphor layer 22 is arranged in the other half region at the negative side of the Y-axis direction. In addition, in this embodiment, the pattern of second phosphor layer 22 matches the pattern obtainable by rotating by 180 degrees the pattern of first phosphor layer 12.

In addition, in this embodiment, second fluorescent plate 20 includes, as a phosphor layer, only second phosphor layer 22 having a uniform composition. In this way, it is possible to easily form second phosphor layer 22 on second fluorescent plate 20 in a one-time process.

Second phosphor layer 22 includes a second wavelength conversion characteristic different from a first wavelength conversion characteristic of first phosphor layer 12. In this embodiment, first phosphor layer 12 of first fluorescent plate 10 may have a wavelength conversion efficiency higher than a wavelength conversion efficiency of second phosphor layer 22. In this way, in first phosphor layer 12 which receives excitation light more intensive than excitation light that enters second phosphor layer 22, it is possible to reduce the amount of excitation light which causes heat and does not contribute to wavelength conversion. In other words, it is possible to reduce the amount of heat in first phosphor layer 12.

There is no limitation on phosphors that can be included in second phosphor layer 22. In this embodiment, SCASN is used as a phosphor. The use of SCASN as a phosphor makes it possible to convert blue excitation light into red fluorescence in second phosphor layer 22. The phosphor included in second phosphor layer 22 has a grain diameter approximately ranging from 1 μm to 30 μm for example. In this embodiment, second phosphor layer 22 includes a phosphor and a sealing member as is the case with first phosphor layer 12. Second phosphor layer 22 may include phosphors having different grain diameters as is the case with first phosphor layer 12, or may be phosphors having approximately the same grain diameters. In addition, it is to be noted that second phosphor layer 22 may include plural kinds of phosphors as the phosphors. Examples of such plural kinds of phosphors for use include YAG, SCASN etc. In this case, the plural kinds of phosphors may be mixed in second phosphor layer 22, or second phosphor layer 22 may be formed with phosphor layers including different kinds of phosphors. In addition, second phosphor layer 22 may have a composition similar to the composition of first phosphor layer 12, and have a thickness different from the thickness of first phosphor layer 12.

Substrate 26 is a translucent member which is a base of second fluorescent plate 20. In this embodiment, substrate 26 has a disc shape as is the case with substrate 16 of first fluorescent plate 10. It is to be noted that substrate 16 may have, for example, a rectangular plate shape, instead of the non-limiting disc shape. Substrate 26 can be made of, for example, sapphire or the like as is the case with substrate 16 of first fluorescent plate 10.

Antireflective films 28 and 29 are films for reducing reflection of excitation light which enters second fluorescent plate 20 and fluorescence emitted from first phosphor layer 12. As illustrated in FIG. 6, antireflective films 28 and 29 are respectively arranged on the principal surface (the surface at the side of incidence of excitation light) of substrate 26 at the excitation light source 50 side (the negative side of the Z-axis direction) and the principal surface of substrate 26 at the downstream side of excitation light (the positive side of the Z-axis direction).

In this embodiment, antireflective films 28 and 29 reduce reflection of visible light including excitation light. It is to be noted that, antireflective films 28 and 29 may be optimized to reduce reflection of light having a wavelength of approximately 445 nm. Antireflective films 28 and 29 for use may be, for example, dielectric multi-layer films. The dielectric multi-layer films are made of, for example, inorganic materials (such as $SiO_2$, $TiO_2$, $Al_2O_3$, MgF) which are highly resistant to light and heat.

[Support]

Support 30 is a member which supports first fluorescent plate 10 and second fluorescent plate 20 in such a manner that at least one of relative positions and postures are adjustable. Depending on the adjustment of the relative positions and postures, when first fluorescent plate 10 and second fluorescent plate 20 are seen in the direction of optical axis J, the surface area of a region in which first phosphor layer 12 is not arranged and second phosphor layer 22 is arranged varies depending on adjustment of the at least one of relative positions and postures of first fluorescent plate 12 and second fluorescent plate 22. In this embodiment, second fluorescent plate 20 is supported rotatably about optical axis J of excitation light. As illustrated in FIG. 1, support 30 includes first support 31 which supports first fluorescent plate 10 and second support 32 which supports second fluorescent plate 20.

In this embodiment, first support 31 is a member which supports first fluorescent plate 10 without changing the position and posture thereof. The configuration of first support 31 is not particularly limited. For example, first support 31 may have a configuration similar to the configuration of a general optical member holder which supports first fluorescent plate by screws or the like.

Second support 32 is a member which supports second fluorescent plate 20 rotatably about optical axis J of excitation light. In this embodiment, second fluorescent plate 20 can be rotated manually by second support 32. It is to be noted that second support 32 may be configured to rotary drives second fluorescent plate 20 by a motor.

Although first support 31 supports first fluorescent plate 10 without changing the position and posture thereof in this embodiment, it is to be noted that first support 31 may support first fluorescent plate 10 rotatably about optical axis J of excitation light.

[Diffuser]

Diffuser 40 is a member which diffuses light emitted from second fluorescent plate 20. In this embodiment, a diffuser made of frosted glass is used as diffuser 40. It is to be noted that the member for use as diffuser 40 is not limited to a diffuser, and that any other member is possible as long as the member diffuses light emitted from second fluorescent plate 20 and thereby mixes excitation light and fluorescence. For example, a lens array (microlens array) or the like of a plurality of lenses can be used as diffuser 40. In addition, when excitation light emitted from second fluorescent plate 20 and fluorescence are sufficiently mixed, luminaire 1 does not need to include diffuser 40.

[2. Operations]

Next, operations performed by luminaire 1 according to the embodiment are described. In luminaire 1 according to this embodiment, the color of light emitted from luminaire 1 (the light color of emitted light) is changed by adjusting at least one of the relative positions and postures of first fluorescent plate 10 and second fluorescent plate 20. Hereinafter, examples of operations performed by luminaire 1 are described with reference to the drawings.

Figure 7A:
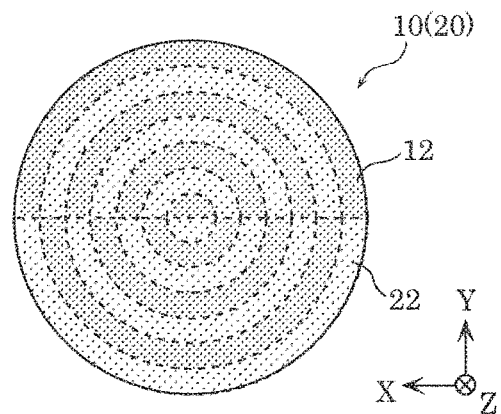
FIG. 7A is a plan view of examples of relative positions and postures of the first fluorescent plate and the second fluorescent plate of the luminaire according to the embodiment.

FIG. 7A is a plan view illustrating an example of relative positions and postures of first fluorescent plate 10 and second fluorescent plate 20 of luminaire 1 according to this embodiment. Each of FIGS. 7A, 7B, and 7C is a plan view when first fluorescent plate 10 and second fluorescent plate 20 are seen in the direction of optical axis J from the excitation light source 50 side.

Figure 7B:
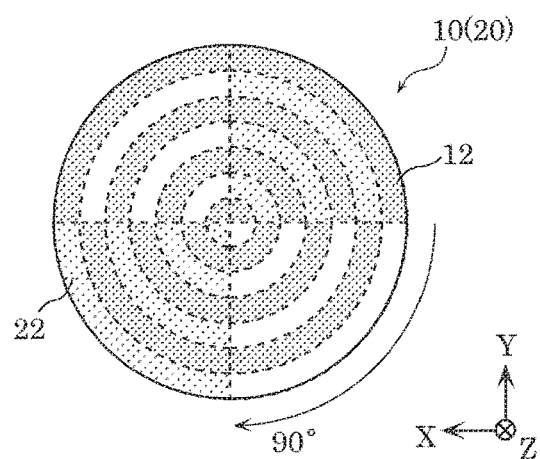
FIG. 7B is a plan view of other examples of relative positions and postures of the first fluorescent plate and the second fluorescent plate of the luminaire according to the embodiment.

FIG. 7B is a plan view illustrating an example of relative positions and postures of first fluorescent plate 10 and second fluorescent plate 20 of luminaire 1 according to this embodiment. FIG. 7B illustrates relative positions and postures of first fluorescent plate 10 and second fluorescent plate 20 in the case where second fluorescent plate 20 is rotated by 90 degrees about optical axis J starting from the state illustrated in FIG. 7A.

Figure 7C:
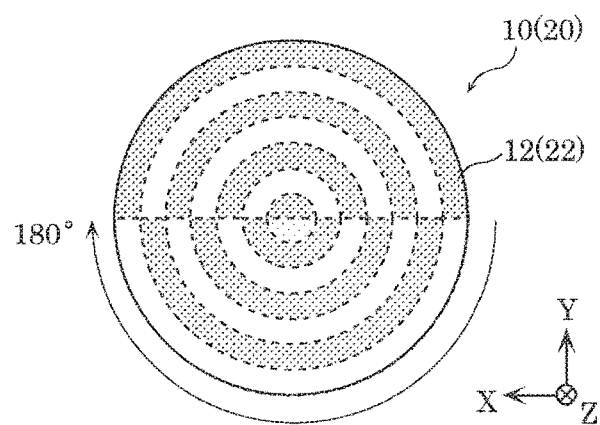
FIG. 7C is a plan view of still other examples of relative positions and postures of the first fluorescent plate and the second fluorescent plate of the luminaire according to the embodiment.

FIG. 7C is a plan view illustrating another example of relative positions and postures of first fluorescent plate 10 and second fluorescent plate 20 of luminaire 1 according to this embodiment. FIG. 7C illustrates relative positions and postures of first fluorescent plate 10 and second fluorescent plate 20 in the case where second fluorescent plate 20 is rotated by 180 degrees about optical axis J starting from the state illustrated in FIG. 7A.

FIG. 7A illustrates an example of a state which is seen from the excitation light source 50 side and in which almost all of the region of second phosphor layer 22 of second fluorescent plate 20 is arranged in a region in which first phosphor layer 12 of first fluorescent plate 10 is not arranged. In this case, on first fluorescent plate 10, almost all of the region of second phosphor layer 22 is irradiated with excitation light which passes through the region in which first phosphor layer 12 of first fluorescent plate 10 is not arranged. In this way, second phosphor layer 22 is sufficiently irradiated with excitation light, red fluorescence is emitted from phosphors made of SCASN in second phosphor layer 22. Accordingly, in the case illustrated in FIG. 7A, light emitted from luminaire 1 has a white color which is close to what is called a warm white fluorescent lamp's color and has a comparatively small number of blue components of excitation light and a comparatively large number of red fluorescent components. It is to be noted that the pattern of first phosphor layer 12 and the pattern of second phosphor layer 22 may have an overlapped region when seen in the direction of optical axis J from the excitation light source 50 side.

FIG. 7B illustrates an example of a state which is seen from the excitation light source 50 side and in which the region of second phosphor layer 22 of second fluorescent plate 20 is arranged in approximately the half region in which first phosphor layer 12 of first fluorescent plate 10 is not arranged. In this case, on first fluorescent plate 10, the region of second phosphor layer 22 is irradiated with almost a half of excitation light which passes through the region in which first phosphor layer 12 is not arranged. In this way, since the region irradiated with excitation light in second phosphor layer 22 is approximately the half of the region illustrated in FIG. 7A, the amount of red fluorescence emitted from phosphors made of SCASN in second phosphor layer 22 is smaller than the amount in the case of FIG. 7A. It is to be noted that in an overlap region of second phosphor layer 22 which overlaps with first phosphor layer 12, second phosphor layer 22 is irradiated with part of excitation light either passes through first phosphor layer 12 or is diffused by first phosphor layer 12. However, the ratio of excitation light is extremely smaller than the amount of excitation light which passes through the region in which first phosphor layer 12 is not arranged in first fluorescent plate 10 and which is for irradiation of second phosphor layer 22. Accordingly, in the case illustrated in FIG. 7B, light emitted from luminaire 1 has more blue components of excitation light and less red fluorescent components than in the case of FIG. 7A.

FIG. 7C illustrates an example of a state which is seen from the excitation light source 50 side and in which second phosphor layer 22 of second fluorescent plate 20 is not arranged in a region in which first phosphor layer 12 of first fluorescent plate 10 is not arranged. In this case, on first fluorescent plate 10, the region in which second phosphor layer 22 of second fluorescent plate 20 is not arranged is irradiated with excitation light which passes through the region in which first phosphor layer 12 is not arranged. In this case, since the amount of excitation light for irradiation of second phosphor layer 22 is extremely small, the amount of red fluorescence emitted from phosphors made of SCASN is small in second phosphor layer 22. Accordingly, in the case illustrated in FIG. 7C, light emitted from luminaire 1 has a white color which is close to what is called neutral white color and has a comparatively large number of blue components of excitation light and a small number of red fluorescent components. It is to be noted that second phosphor layer 22 does not need to be completely hidden by first phosphor layer 12 when seen in the direction of optical axis J from the excitation light source 50 side. For example, part of second phosphor layer 22 may be arranged outside the region of first phosphor layer 12.

As described above, in this embodiment, it is possible to change the color of light emitted from luminaire 1 (the light color of emitted light) by adjusting at least one of the relative positions and postures of first fluorescent plate 10 and second fluorescent plate 20.

[3. Conclusion]

As described above, luminaire 1 according to the embodiment includes excitation light source 50 which emits excitation light. In addition, luminaire 1 further includes: first fluorescent plate 10 disposed across optical axis J of the excitation light, and including first phosphor layer 12 arranged discretely when first fluorescent plate 10 is seen in the direction of the optical axis. In addition, luminaire 1 further includes second fluorescent plate 20 (i) arranged at the downstream side of the excitation light with respect to first fluorescent plate 10 disposed across optical axis J, and (ii) including second phosphor layer 22 having a wavelength conversion characteristic different from a wavelength conversion characteristic of first phosphor layer 12 and arranged discretely when second fluorescent plate 20 is seen in the direction of optical axis J. In addition, luminaire 1 further includes support 30 which supports first fluorescent plate 10 and second fluorescent plate 20 in such a manner that at least one of relative positions and postures of first fluorescent plate 10 and second fluorescent plate 20 are adjustable.

In other words, luminaire 1 includes: an excitation light source which emits excitation light; a first fluorescent plate including a first principle surface disposed across an optical axis of the excitation light and a first phosphor layer arranged discretely along the first principle surface; a second fluorescent plate arranged at a downstream side of the excitation light with respect to the first fluorescent plate, the second fluorescent plate including a second principle surface disposed across the optical axis and a second phosphor layer arranged discretely along the second principle surface, the second phosphor layer having a wavelength conversion characteristic different from a wavelength conversion characteristic of the first phosphor layer; and a support which supports the first fluorescent plate and the second fluorescent plate such that at least one of relative positions and rotations of the first fluorescent plate and the second fluorescent plate are adjustable.

In this way, it is possible to adjust at least one of the relative positions and postures of first fluorescent plate 10 and second fluorescent plate 20 using support 30. In this way, it is possible to change the amount of fluorescence emitted from second phosphor layer 22 by adjusting the amount of excitation light which passes through first fluorescent plate 10 and which is for irradiation of second phosphor layer 22 of second fluorescent plate 20. Here, since first phosphor layer 12 and second phosphor layer 22 have different wavelength characteristics, it is possible to change the color of light emitted from luminaire 1 by the adjustment. Furthermore, luminaire 1 does not require any change in the optical axis of excitation light, which contributes to reduction in the dimensions thereof.

In addition, in luminaire 1, when first fluorescent plate 10 and second fluorescent plate 20 are seen in the direction of optical axis J, the surface area of a region in which first phosphor layer 12 is not arranged and second phosphor layer 22 is arranged may vary depending on adjustment of the at least one of relative positions and postures of first fluorescent plate 10 and second fluorescent plate 20.

In this way, depending on the adjustment, it is possible to adjust the amount of excitation light which passes through the region in which first phosphor layer 12 is not arranged and which is for irradiation of second phosphor layer 22. For this reason, with the adjustment, it is possible to adjust the color of light emitted from luminaire 1.

In addition, in luminaire 1, first phosphor layer 12 may be arranged in a line symmetric manner in first fluorescent plate 10, and second phosphor layer 22 may be arranged in a line symmetric manner in second fluorescent plate 22.

In addition, in luminaire 1, the arrangement pattern of second phosphor layer 22 may substantially match the pattern of a region in first fluorescent plate 10 in which first phosphor layer 12 is not arranged. The term substantially is used herein with regards to pattern matching to indicate, for example, that at least 95% of the arrangement pattern of second phosphor layer 22 matches the pattern of the region in first fluorescent plate 10 in which first phosphor layer 12 is not arranged.

In this way, it is possible to irradiate almost all of the region of second phosphor layer 22 with excitation light, and thus to effectively use second phosphor layer 22.

In addition, in luminaire 1, the arrangement pattern of first phosphor layer 12 substantially matches the arrangement pattern obtained when the arrangement pattern of second phosphor layer 22 is rotated a predetermined angle.

By rotating second fluorescent plate 20 in this way, it is possible to create a state in which second phosphor layer 22 is not seen from the excitation light source 50 side in the direction of optical axis J. For this reason, it is possible to reduce the amount of fluorescence emitted from second phosphor layer 22. In other words, it is possible to enlarge the adjustment width in the color of light emitted from luminaire 1.

In addition, in luminaire 1, support 30 supports at least one of first fluorescent plate 10 and second fluorescent plate 20 rotatably about optical axis J.

In this way, it is possible to adjust the relative positions (angles) of first fluorescent plate 10 and second fluorescent plate 20. In this way, it is possible to change the amount of fluorescence emitted from second phosphor layer 22 by adjusting, in the above manner, the amount of excitation light which passes through first fluorescent plate 10 and which is for irradiation of second phosphor layer 22 of second fluorescent plate 20.

In addition, in luminaire 1, first phosphor layer 12 may have a wavelength conversion efficiency higher than the wavelength conversion efficiency of second phosphor layer 22.

In this way, in first phosphor layer 12 which receives excitation light more intensive than excitation light that enters second phosphor layer 22, it is possible to reduce the amount of excitation light which causes heat and does not contribute to wavelength conversion, and thereby reduce the amount of heat in first phosphor layer 12.

In addition, in luminaire 1, first fluorescent plate 10 may include only first phosphor layer 12 as a phosphor layer, and first phosphor layer 12 may have a uniform composition. In addition, second fluorescent plate 20 may include only second phosphor layer 22 as a phosphor layer, and phosphor layer 22 may have a uniform composition.

In this way, it is possible to easily form the phosphor layers on respective first fluorescent plate 10 and second fluorescent plate 20 in a one-time process.

In addition, luminaire 1 may further include diffuser 40 which diffuses light emitted from second fluorescent plate 20.

In this way, it is possible to equalize the color of light emitted from luminaire 1 by diffusing excitation light and fluorescence emitted from second fluorescent plate 20.

In addition, in luminaire 1, diffuser 40 may be a diffusing panel.

In addition, in luminaire 1, diffuser 40 may be a lens array.

In addition, luminaire 1 may further include dichroic mirror 14 provided at the upstream side of the excitation light with respect to first phosphor layer 12 of first fluorescent plate 10, and dichroic mirror 14 allows the excitation light to pass through and reflect fluorescence emitted from first phosphor layer 12.

In this way, dichroic mirror 14 reduces propagation of fluorescence emitted from first phosphor layer 12 to the excitation light source 50 side. For this reason, it is possible to increase use efficiency of fluorescence emitted from first phosphor layer 12. In other words, it is possible to increase the amount of fluorescence to be emitted from luminaire 1.

In addition, luminaire 1 includes antireflective films 18 and 28 each provided on the incidence surface of the excitation light of a corresponding one of first fluorescent plate 10 and second fluorescent plate 20, and each antireflective film prevents reflection of the excitation light.

In this way, it is possible to reduce reflection of excitation light in first fluorescent plate 10 and second fluorescent plate 20, and thus to use the excitation light efficiently.

In addition, in luminaire 1, an arrangement pattern of the first phosphor layer and an arrangement pattern of the second phosphor layer may be complementary.

In addition, in luminaire 1, an arrangement pattern of at least one of the first phosphor layer and the second phosphor layer may be symmetrical about a first axis and asymmetrical about a second axis perpendicular to the first axis.

In addition, in luminaire 1, the arrangement pattern of the at least one of the first phosphor layer and the second phosphor layer may be symmetrical with an arrangement pattern of areas in which the at least one of the first phosphor layer and the second phosphor layer is not arranged about the second axis.

In addition, in luminaire 1, one of the first fluorescent plate and the second fluorescent plate may be fixedly attached to the support.

In addition, a method of manufacturing a color adjusting component of a luminaire according to this embodiment is a method of manufacturing a color adjusting component of a luminaire, the color adjusting component configured to receive excitation light from an excitation light source, the method including: applying a first phosphor layer along a first principle surface of a first fluorescent plate in a one-time process, the first phosphor layer being arranged discretely along the first principle surface; applying a second phosphor layer along a second principle surface of a second fluorescent plate in a one-time process, the second phosphor layer being arranged discretely along the second principle surface and having a wavelength conversion characteristic different from a wavelength conversion characteristic of the first phosphor layer; and supporting the first fluorescent plate and the second fluorescent plate such that at least one of relative positions and rotations of the first fluorescent plate and the second fluorescent plate are adjustable.

Variation Etc.

Although an aspect of the luminaire according to the present disclosure has been described above based on an embodiment, the present disclosure is not limited to the above-described embodiment.

For example, although examples of patterns of arranging first phosphor layers 12 and second phosphor layers 22 have been described in the above embodiment, arrangement patterns are not limited to the examples in the above embodiment. Here, other examples of arrangement patterns are described with reference to some of the drawings.

Figure 8A:
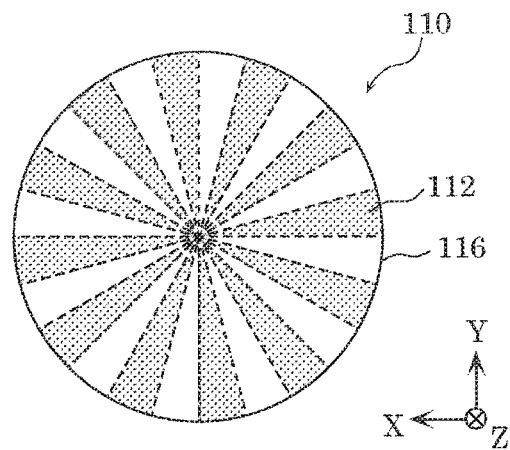
FIG. 8A is a plan view of a rough arrangement pattern of a first phosphor layer according to Variation 1.

FIG. 8A is a plan view of a rough arrangement pattern of first phosphor layer 112 according to Variation 1. FIG. 8A is a plan view in the case where first fluorescent plate 110 is seen from the excitation light source 50 side in the direction of optical axis J.

Figure 8B:
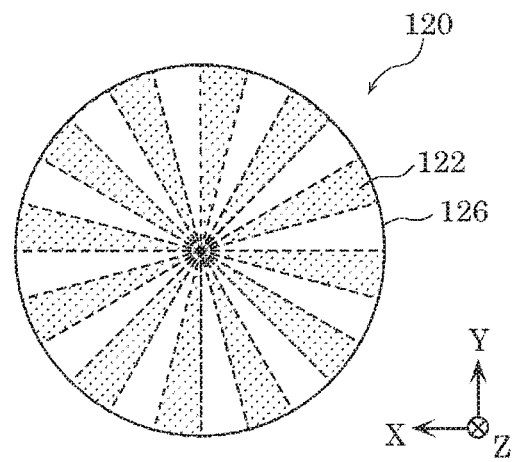
FIG. 8B is a plan view of a rough arrangement pattern of a second phosphor layer according to Variation 1.

FIG. 8B is a plan view of a rough arrangement pattern of a second phosphor layer according to Variation 1. FIG. 8B is a plan view in the case where second fluorescent plate 120 is seen from the excitation light source 50 side in the direction of optical axis J.

In each of the examples in FIG. 8A and FIG. 8B, first phosphor layers 112 are arranged in a rotationally symmetric manner and in a point symmetric manner on substrate 116 of first fluorescent plate 110, and second phosphor layers 122 are arranged in a rotationally symmetric manner and in a point symmetric manner on substrate 126 of second fluorescent plate 120. In addition, the arrangement pattern of second phosphor layer 122 approximately matches the pattern of the region in which first phosphor layer 112 is not arranged in first fluorescent plate 110. In addition, the arrangement pattern of first phosphor layer 112 approximately matches the arrangement pattern obtainable by rotating the arrangement pattern of second phosphor layer 122 about optical axis J.

In this variation, it is possible to provide an effect similar to the effect obtainable in the above embodiment.

Figure 9A:
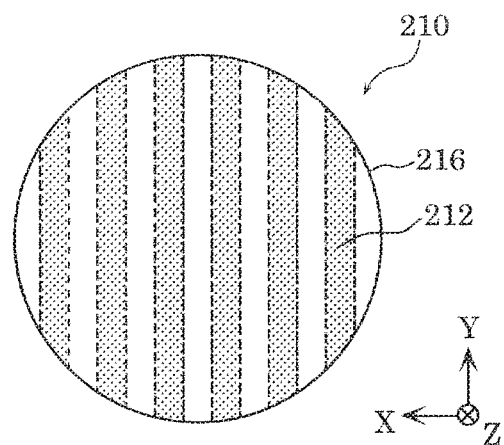
FIG. 9A is a plan view of a rough arrangement pattern of a first phosphor layer according to Variation 2.

FIG. 9A is a plan view of a rough arrangement pattern of first phosphor layer 212 according to Variation 2. FIG. 9A is a plan view in the case where first fluorescent plate 210 is seen from the excitation light source 50 side in the direction of optical axis J.

Figure 9B:
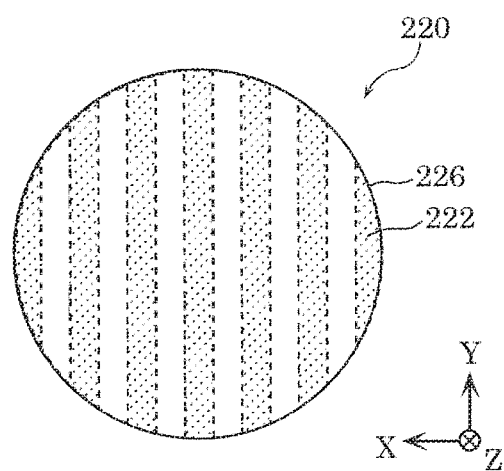
FIG. 9B is a plan view of a rough arrangement pattern of a second phosphor layer according to Variation 2.

FIG. 9B is a plan view of a rough arrangement pattern of second phosphor layer 222 according to Variation 2. FIG. 9B is a plan view in the case where second fluorescent plate 220 is seen from the excitation light source 50 side in the direction of optical axis J.

In each of the examples in FIG. 9A and FIG. 9B, first phosphor layers 212 are arranged in a point symmetric manner and in a line symmetric manner on substrate 216 of first fluorescent plate 10, and second phosphor layers 222 are arranged in a point symmetric manner and in a line symmetric manner on substrate 226 of second fluorescent plate 220. In addition, the arrangement pattern of second phosphor layer 222 approximately matches the pattern of the region in which first phosphor layer 212 is not arranged in first fluorescent plate 210. In addition, most of the arrangement pattern of first phosphor layer 212 matches the arrangement pattern obtainable by translating the arrangement pattern of second phosphor layer 222 in the X-axis direction.

In this variation, it is possible to provide an effect similar to the effect obtainable in the above embodiment. In addition, in this variation, it is possible to adjust the color of light to be emitted by adjusting the relative positions of first fluorescent plate 210 and second fluorescent plate 220. For example, it is possible to adjust the color of light to be emitted by translating the position of second fluorescent plate 220 with respect to first fluorescent plate 210 in the X-axis direction. It is also possible, in this variation, to adjust the color of light to be emitted by adjusting the relative postures (angles) of first fluorescent plate 210 and second fluorescent plate 220. For example, it is possible to adjust the color of light to be emitted by rotating second fluorescent plate 220 about optical axis J.

In addition, specific implementations of luminaire 1 according to the above-described embodiment are not limited to particular ones. Luminaire 1 can be used, for example, in a spotlight.

Figure 10:
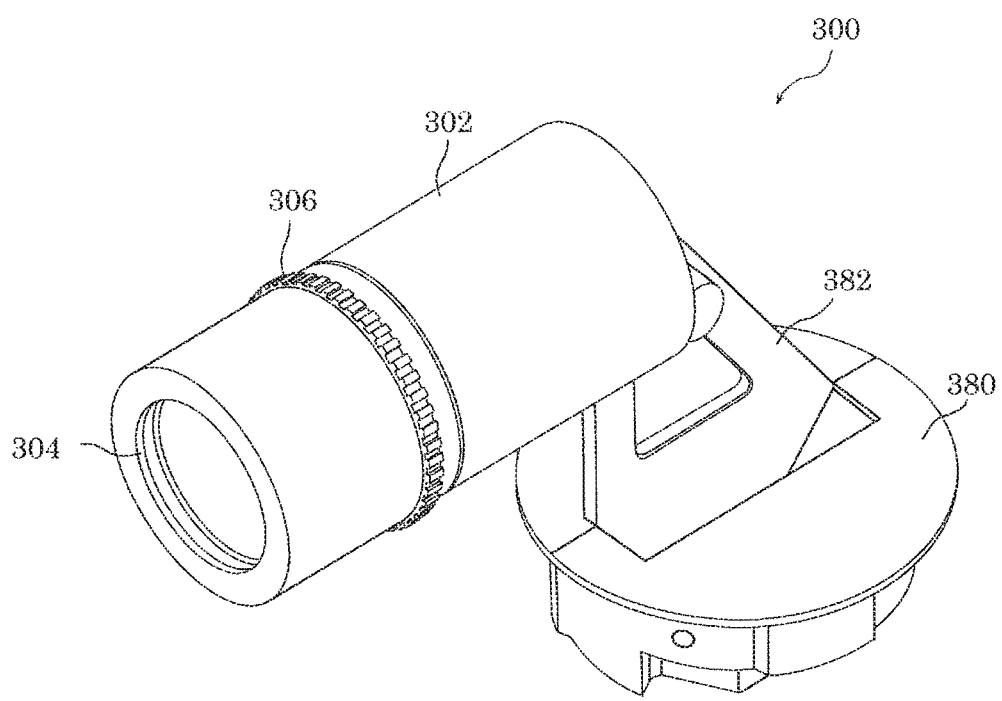
FIG. 10 is a perspective view schematically illustrating an appearance of a spot light with the luminaire according to the embodiment.

FIG. 10 is a perspective view schematically illustrating an appearance of spotlight 300 with luminaire 1 according to the embodiment.

Spotlight 300 includes lighting fitting 302, arm 382, and fixing member 380. Arm 382 is a member which supports lighting fitting 302. Fixing member 380 is a member for fixing spotlight 300. Lighting fitting 302 is a cylindrical member in which luminaire 1 is arranged, and emits light from emission part 304 thereof. Lighting fitting 302 includes adjustment part 306 which is rotatable along the side surface of the cylindrical member. Adjustment part 306 is a part of support 30, and in this variation, it is possible to rotate second fluorescent plate 20 arranged therein about optical axis J of excitation light, in conjunction with the rotation of adjustment part 306. In other words, it is possible to adjust the color of light to be emitted from spotlight 300 by rotating adjustment part 306.

With luminaire 1 arranged in spotlight 300, it is possible to adjust the color of light to be emitted. Furthermore, luminaire 1 with adjustment part 306 for adjusting the color of light to be emitted can be configured to have reduced dimensions.

In addition, although a semiconductor laser element is taken as an example in the above embodiment, a semiconductor light emitting element such as a light emitting diode (LED) or any other light source such as an organic electro luminescence (EL) or an inorganic EL may be used as an excitation light source.

In addition, the configuration for adjusting relative postures (angles) of first fluorescent plate 10 and second fluorescent plate 20 and the configuration for adjusting relative positions in the X-axis direction have been described as examples of adjusting the relative positions and postures of first fluorescent plate 10 and second fluorescent plate 20. However, adjustments of relative positions and postures are not limited thereto. It is only necessary that, when first fluorescent plate 10 and second fluorescent plate 20 are seen in the direction of optical axis J, the surface area of a region in which first phosphor layer 12 is not arranged and second phosphor layer 22 is arranged is adjusted.

In addition, the above embodiment describes the configuration for emitting white light by excitation light source 50 with a blue semiconductor laser element and phosphors made of YAG and SCASN. However, the configuration of phosphors etc. is not limited thereto. For example, it is also good to implement a configuration for emitting white light by using phosphor-containing resin containing red phosphors and green phosphors and combining the resin with excitation light source 50 with a blue semiconductor laser element.

While the foregoing has described one embodiment and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A luminaire comprising:
an excitation light source which emits excitation light;
a first fluorescent plate including a first principle surface disposed across an optical axis of the excitation light and a first phosphor layer arranged discretely along the first principle surface;
a second fluorescent plate arranged at a downstream side of the excitation light with respect to the first fluorescent plate, the second fluorescent plate including a second principle surface disposed across the optical axis and a second phosphor layer arranged discretely along the second principle surface, the second phosphor layer having a wavelength conversion characteristic different from a wavelength conversion characteristic of the first phosphor layer; and
a support which supports the first fluorescent plate and the second fluorescent plate such that at least one of relative positions and rotations of the first fluorescent plate and the second fluorescent plate are adjustable,
wherein at least one of the first fluorescent plate and the second fluorescent plate includes a disc shape,
the support supports the at least one of the first fluorescent plate and the second fluorescent plate rotatably about the optical axis, and
the first phosphor layer has a wavelength conversion efficiency higher than a wavelength conversion efficiency of the second phosphor layer.

2. The luminaire according to claim 1,
wherein, along the optical axis, areas in which the first phosphor layer is not arranged and the second phosphor layer is arranged vary depending on adjustment of the at least one of relative positions and rotations of the first fluorescent plate and the second fluorescent plate.

3. The luminaire according to claim 1,
wherein the first phosphor layer is arranged in a rotationally symmetric manner along the first principle surface, and
the second phosphor layer is arranged in a rotationally symmetric manner along the second principle surface.

4. The luminaire according to claim 1,
wherein the first phosphor layer is arranged in a point symmetric manner along the first principle surface, and
the second phosphor layer is arranged in a point symmetric manner along the second principle surface.

5. The luminaire according to claim 1,
wherein the first phosphor layer is arranged in a line symmetric manner along the first principle surface, and
the second phosphor layer is arranged in a line symmetric manner along the second principle surface.

6. The luminaire according to claim 1,
wherein an arrangement pattern of the second phosphor layer substantially matches a pattern along the first principle surface in which the first phosphor layer is not arranged.

7. The luminaire according to claim 1,
wherein an arrangement pattern of the first phosphor layer substantially matches an arrangement pattern of the second phosphor layer when the second fluorescent plate is rotated a predetermined angle relative to the first fluorescent plate.

8. The luminaire according to claim 1,
wherein the first fluorescent plate includes only the first phosphor layer as a phosphor layer,
the first phosphor layer has a uniform composition,
the second fluorescent plate includes only the second phosphor layer as a phosphor layer, and
the second phosphor layer has a uniform composition.

9. The luminaire according to claim 1, further comprising:
a diffuser which is arranged at the downstream side of the excitation light with respect to the second fluorescent plate, and diffuses light emitted from the second fluorescent plate.

10. The luminaire according to claim 9,
wherein the diffuser is a diffusing panel.

11. The luminaire according to claim 9,
wherein the diffuser is a lens array.

12. The luminaire according to claim 1, further comprising:
a dichroic mirror provided at an upstream side of the excitation light with respect to the first phosphor layer of the first fluorescent plate, the excitation light passing through the dichroic mirror and reflecting fluorescence emitted from the first phosphor layer.

13. The luminaire according to claim 1, further comprising:
an antireflective film provided on an incidence surface of each of the first fluorescent plate and the second fluorescent plate, the excitation light being incident to the incidence surface, the antireflective film preventing reflection of the excitation light.

14. The luminaire according to claim 1, wherein an arrangement pattern of the first phosphor layer and an arrangement pattern of the second phosphor layer are complementary.

15. The luminaire according to claim 1, wherein an arrangement pattern of at least one of the first phosphor layer and the second phosphor layer is symmetrical about a first axis and asymmetrical about a second axis perpendicular to the first axis.

16. The luminaire according to claim 15, wherein the arrangement pattern of the at least one of the first phosphor layer and the second phosphor layer is symmetrical with an arrangement pattern of areas in which the at least one of the first phosphor layer and the second phosphor layer is not arranged about the second axis.

17. The luminaire according to claim 1, wherein one of the first fluorescent plate and the second fluorescent plate is fixedly attached to the support.

18. A method of manufacturing a color adjusting component of a luminaire, the color adjusting component configured to receive excitation light from an excitation light source, the method comprising:
applying a first phosphor layer along a first principle surface of a first fluorescent plate in a one-time process, the first phosphor layer being arranged discretely along the first principle surface;
applying a second phosphor layer along a second principle surface of a second fluorescent plate in a one-time process, the second phosphor layer being arranged discretely along the second principle surface and having a wavelength conversion characteristic different from a wavelength conversion characteristic of the first phosphor layer; and
supporting the first fluorescent plate and the second fluorescent plate such that at least one of relative positions and rotations of the first fluorescent plate and the second fluorescent plate are adjustable,
wherein at least one of the first fluorescent plate and the second fluorescent plate includes a disc shape,
the at least one of the first fluorescent plate and the second fluorescent plate is supported to be rotatable about the optical axis,
the first fluorescent plate is disposed across the optical axis of the excitation light, and the second fluorescent plate is disposed at a downstream side of the optical axis of the excitation light relative to the first fluorescent plate, and
the first phosphor layer has a wavelength conversion efficiency higher than a wavelength conversion efficiency of the second phosphor layer.

* * * * *